Jan. 6, 1931.  N. A. CHRISTENSEN  1,787,613
BRAKE OPERATING APPARATUS
Filed May 21, 1928    2 Sheets-Sheet 1
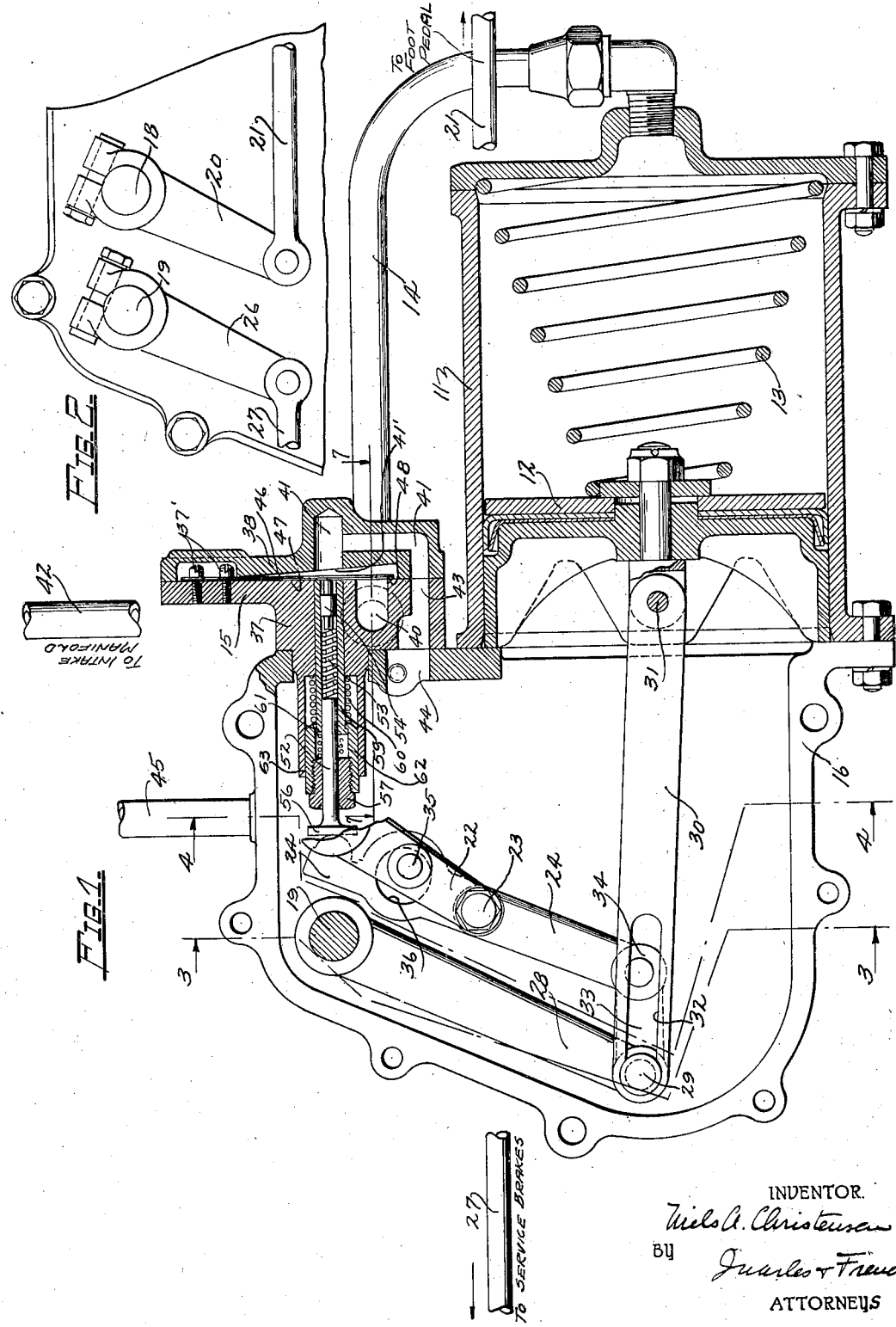
INVENTOR.
Niels A. Christensen
BY
Quarles & French
ATTORNEYS

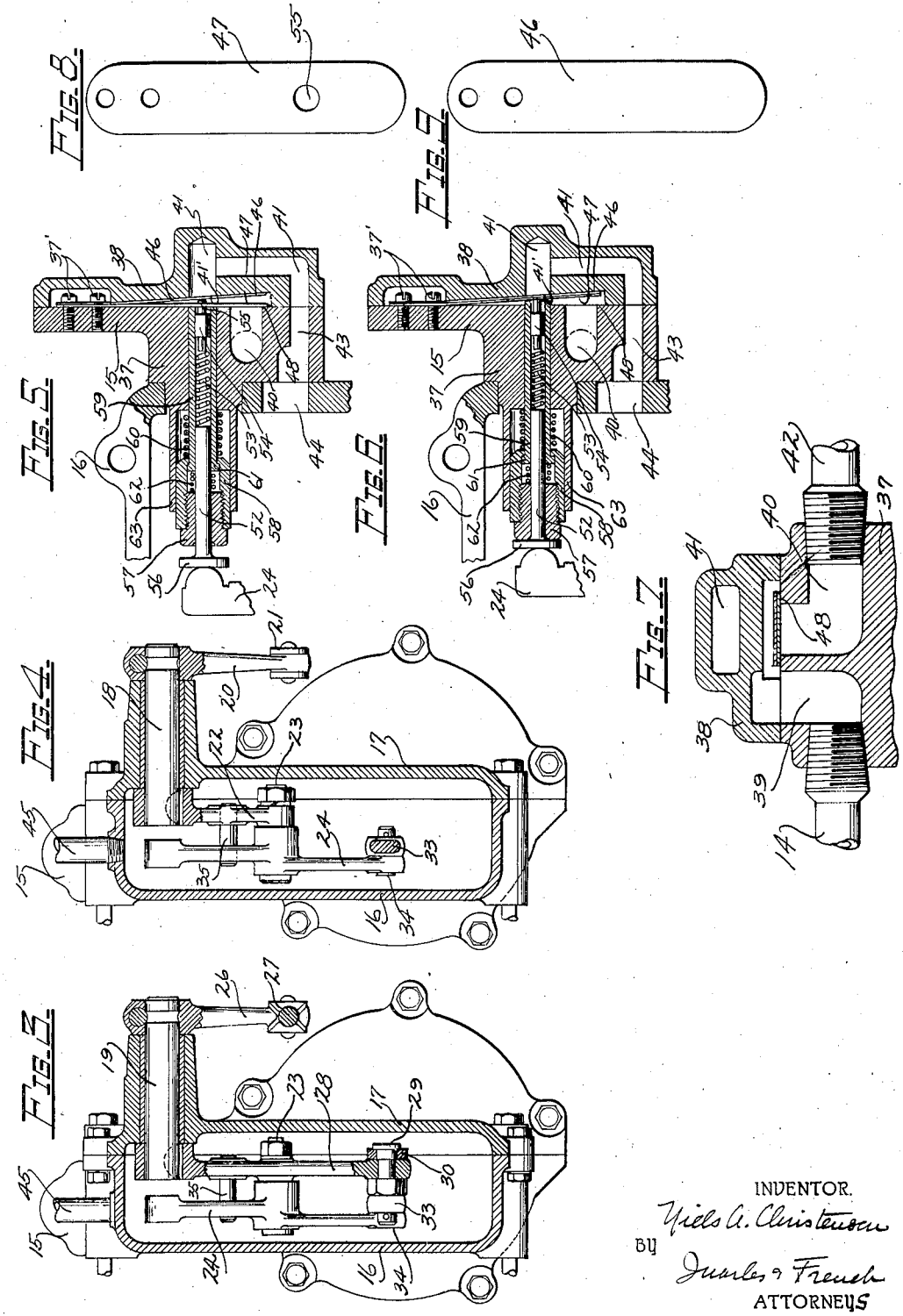

Patented Jan. 6, 1931

1,787,613

UNITED STATES PATENT OFFICE

NIELS A. CHRISTENSEN, OF CLEVELAND, OHIO

BRAKE-OPERATING APPARATUS

Application filed May 21, 1928. Serial No. 279,338.

The invention relates to brake mechanism for automotive vehicles.

The general object of this invention is to provide brake-operating mechanism employing the general arrangement and combination of elements of that of my prior United States Patent No. 1,291,765, dated January 21, 1919, but more particularly where the power source of braking pressure is obtained by the suction or vacuum effect of the power plant of the vehicle.

A further object of the invention is to provide a brake-operating mechanism of the type above described in which the valve mechanism comprises a pair of leaf spring or feather valves arranged in a novel manner to provide for connecting the brake cylinder to engine suction or atmosphere, or to move to a lap position when the brake is applied.

The invention further consists in the several features hereinafter set forth and more particularly defined by claims at the conclusion hereof.

In the drawings Fig. 1 is a vertical sectional view through brake-operating apparatus embodying the invention, the parts being in a release position;

Fig. 2 is a detail front view of parts of the apparatus;

Fig. 3 is a detail sectional view taken on the line 3—3 of Fig. 1;

Fig. 4 is a detail sectional view taken on the line 4—4 of Fig. 1;
Fig. 5 is a detail sectional view through the valve mechanism showing the parts in an intermediate position;

Fig. 6 is a view similar to Fig. 5, showing the valve mechanism in power application position;

Fig. 7 is a detail sectional view through the valve mechanism, taken on the line 7—7 of Fig. 1;

Fig. 8 is a plan view of one of the valves;
Fig. 9 is a plan view of the other valve.

As in my prior Patent, No. 1,291,765, the combination and arrangement of parts is such that the first movement of the foot pedal by the operator brings about the application of the power source to apply the brakes and a continued movement of the foot pedal may be used to augment this power application or may be used alone in case the power source is not available.

Referring to the drawings, the numeral 11 designates a brake cylinder having a piston 12 working therein and normally urged to a release position by a spring 13, the front end of said cylinder being connected by a pipe 14 to a valve casing 15 having valve mechanism therein controlling the connection of pipe 14 either to atmosphere or with the inlet manifold of the engine.

The brake cylinder 11 is bolted or otherwise suitably secured to a casing 16 which in turn is adapted to be secured by brackets (not shown) to the framework of the vehicle chassis, said housing including a back plate section and a removable housing section 17.

The shafts 18 and 19 are suitably journalled in the casing. The shaft 18 has a lever arm 20 secured thereto, outside the casing, and operatively connected by a link 21 with the operator's brake pedal (not shown) and has a lever arm 22 carrying a pivot pin or bolt 23 on its free end, upon which a floating lever 24 is pivoted intermediate its ends.

The shaft 19 has a lever arm 26, outside said casing, connected to a brake-rod or operating member 27 which is adapted to be connected in any suitable or known manner with the regular brake mechanism associated with the wheels of the vehicle and a lever arm 28, inside the casing, connected at its outer end by a pin 29 and a connecting-rod 30 with a wristpin 31 carried by the piston 12, the end of said rod having a slot 32 formed therein to provide a lost-motion connection between said lever and said piston.
The arm 28 is operatively connected by a link 33 with the inner or lower end 34 of the lever 24. The lever 24 is limited in its movement relative to the arm 22 by a pin 35 secured to said arm and engageable with sides of a slot or hole 36 in said lever 24.

The valve mechanism includes a two-part casing 15 suitably secured to the casing 16, one of said parts 37 being provided with ports 39 and 40 and the other of said parts 38 with a port 41. Port 39 is connected by the pipe 14 with the front end of the brake cylinder 11 and port 40 is connected by a pipe 42 with the intake manifold (not shown) of the engine. Port 41 extends downwardly and connects through an alined port 43 with the interior 44 of the casing 16 which is either in direct communication with the atmosphere or is connected therewith by a pipe 45 leading to the crankcase of the engine. Control of these ports is effected by a pair of superimposed, spring leaf or plate valves 46 and 47, both of which are anchored at one end to the section 37 of the valve casing by screws 37', the valve 47 extending across the inner flat face of the casing and seating over the end 48 of the port 40, the valve 46 being movable to seat against the inclined seat 41' of the port 41, the casing section 38 being recessed to accommodate this movement.

The valves are operated by a connection with the floating lever 24, said lever being engageable with a plunger 52 operatively connected by a spring 53, shouldered pin 54 working freely through a hole 55 in valve 47 with the valve 46 and operatively connected with the valve 47 by the engagement of its head 56 with another plunger formed by a bored cap nut 57 through which the stem of plunger 52 works, a sleeve 58 secured to said nut and carrying a tube 59 engaging said valve 47. This last-named plunger is preferably moved to a release position by a spring 60. The tube 59 has a shouldered end 61 held in engagement with the inner flanged end of the sleeve 58 by a spring 62 interposed between the end of said nut 57 and the inner end of said sleeve. The stem of the plunger 52, the spring 53 and pin 54 work in the bore of the tube 59 and the sleeve 58 is guided in a tubular extension 63 of the casing section 38.

With this construction, when the operator steps on the foot pedal and thereby moves the link 21 to the right, as viewed in Fig. 1, the first movement of said link swings the arms 20 and 22 and rocks the shaft 18 in counterclockwise direction, the link 33 being then firmly held by the release springs of the brake system by the action of said springs restraining the movement of rod 27 and the levers 26 and 28, as will be readily understood by those familiar with this art, whereby that end of the link associated with the end 34 of the lever 24 forms a fulcrum for said lever which then, under the action of pin 35 moving with the arm 22, swings the upper end of said lever 24 toward the right and into engagement with the plunger 52, moving it inwardly. Inward movement of the plunger 52 is transmitted by the spring 53 to the pin 54, which moves inwardly to move the valve 46 from the release position shown in Fig. 1 to the position shown in Fig. 5, thereby closing the release port 41. When this has taken place the spring 53 will be compressed to such an extent that the head 56 of said plunger engages the nut 57 of the second-described plunger when said second plunger will be moved forwardly against the pressure of spring 60, the tubular stem 59 of this second plunger then moving valve 47 off its seat 48, as shown in Fig. 6, and establishing communication between the ports 40 and 39 and thereby establish communication between the intake manifold and the brake cylinder, and air will be drawn out of the brake cylinder space by suction of the engine and thus move piston 12 forwardly and through rod 30, lever 28, shaft 19, lever 26 and rod 27 to apply the brakes. By interposing the spring 62 between the tube 59 and the nut 57 relative movement of these parts can take place whereby an overrunning connection is provided that makes the opening movement of the valve 46 by the movement of the tube 59 independent of a longer travel of the nut 57 and sleeve 58 under the action of lever 24, thereby relieving the parts of valve 46 and tube 59 of undue strains and permitting pin 35, contacting with opening 36, to take the strains exerted on the end of the push-pin 56 by the lever 24. If the operator keeps his foot in a fixed position after this application has been made, the motion of the piston will, through rod 30, arm 28, link 33 and lever 24, move the upper end of said lever 24 back slightly and this will allow spring 47 to seat and cut off communication between the ports 39 and 40, the valve being then in the lap position shown in Fig. 5, and hold the brakes applied in that position with the amount of pressure then existing but not open the release valve, and a further backward movement of the operator's foot pedal will cause the brakes to be either wholly released or partly released in any position. In other words, with the valve mechanism herein shown the brakes can be applied and released in any of the intermediate positions of the piston 12 and a further movement of the operator's pedal will produce a further braking effect on a further increase of suction pressure. Furthermore, after the movement of the piston 12 by the power source, a continued movement of the foot pedal and hence a continued forward movement of link 21 will produce a direct pull on the rod 27 and the brake mechanism, the lost-motion connection between rod 30 and arm 28 preventing any interference to this action and the manifold pressure remaining on.

On a release of the foot pedal the floating lever 24 is moved to a release position under the action of the movement of the rod 27 to its release position and the valves 46 and 47 move to release position by their own resiliency and the parts associated therewith move to release position under the action of their springs. As soon as the valves 46 and 47 move to release position equilibrium of pressure is established between the space in front of the piston 12 and the space connected with atmosphere, including the casing 44, through ports 43, 41 and pipe 14, so that the piston 12 travels to a release position under the action of the spring 13.

I desire it to be understood that this invention is not to be limited to any particular form or arrangement of parts except insofar as such limitations are included in the claims.

What I claim as my invention is:

1. In brake-operating mechanism for automotive vehicles, the combination with a brake cylinder and a pressure-responsive brake-operating member in said cylinder, of valve mechanism controlling the operation of said member comprising a casing provided with a release port, a suction inlet port and a brake cylinder port, a pair of superimposed leaf spring valves mounted in said casing, one of said valves controlling said release port, the other of said valves controlling said suction inlet port, the valve-operating means under the control of the operator for controlling the operation of said valves, said valve-operating means being also connected with said member for establishing a lap position of said valves.

2. In brake-operating mechanism for automotive vehicles, the combination with a brake cylinder and a pressure-responsive brake-operating member in said cylinder, of valve mechanism controlling the operation of said member comprising a casing provided with a release port, a suction inlet port and a brake cylinder port, a pair of superimposed leaf spring valves mounted in said casing, one of said valves controlling said release port, the other of said valves controlling said suction inlet port, means normally urging said valves to a release position, valve-operating means under the control of the operator for first moving said first-named valve to close the release port and then moving said second-named valve to open said suction inlet port and having a connection with said piston including a floating lever for permitting said second-named valve to close said suction inlet port while said first-named valve closes off said release port.

3. In brake-operating apparatus for automotive vehicles, the combination with a brake cylinder and a pressure-responsive brake-operating member in said cylinder, of valve mechanism controlling the operation of said member comprising a casing provided with a release port, a suction inlet port and a brake cylinder port, and a pair of superimposed leaf spring valves mounted in said casing, one of said valves controlling said release port, the other of said valves controlling said suction inlet port, a pair of shafts, one of said shafts being manually operable and carrying a lever arm, a floating lever pivoted intermediate its ends to said lever arm, means for operating said valves by said floating lever to first move said first-named valve to close said release port and then move said second-named valve to open said suction inlet port, the other of said shafts carrying a lever arm, a lost-motion connection between said last-named arm and said pressure-responsive brake-operating member, a link connection between said last-named arm and the other end of said floating lever, and means for connecting said last-named shaft to the brakes.

4. In brake-operating apparatus for automotive vehicles, the combination with a brake cylinder and a pressure responsive brake-operating member in said cylinder, of control valve mechanism for the pressure-responsive brake-operating member, comprising a casing provided with a release port, a suction inlet port and a brake cylinder port connected with said brake cylinder, and superimposed inlet and release leaf spring valves mounted in said casing, valve-operating means under the control of the operator comprising a pair of movable plungers respectively associated with said valves, one plunger connected to first move said release valve to its seat and then move the other of said plungers to open the inlet valve controlling the suction inlet port, said plungers being also movable relative to each other to establish a lap position of said valves.

5. In brake-operating apparatus for automotive vehicles, the combination with a brake cylinder and a pressure responsive brake-operating member in said cylinder, of control valve mechanism for the pressure-responsive break-operating member comprising a casing provided with a release port, a suction inlet port and a brake cylinder port connected with said brake cylinder, and superimposed inlet and release leaf spring valves mounted in said casing, means for urging said valves to a release position in which said inlet valve closes said suction inlet port, means extending through said inlet valve for moving said release valve to close said release port, and means for operating said inlet valve while said release valve remains seated.

6. In brake-operating apparatus for automotive vehicles, the combination with a brake cylinder and a pressure responsive brake-operating member in said cylinder, of control valve mechanism for the pressure-responsive brake-operating member, comprising a casing provided with a release port, a suction inlet port and a brake cylinder port connected with said brake cylinder, and superimposed inlet and release leaf spring valves mounted in said casing, valve-operating means under the control of the operator comprising a pair of movable plungers respectively associated with said valves, one punger connected to first move said release valve to its seat and having relatively movable, yieldably connected parts, and then move the other of said plungers to open the inlet valve controlling the suction inlet port, said plungers being also movable relative to each other to establish a lap position of said valves.

7. In brake-operating apparatus for automotive vehicles, the combination with a brake cylinder and a pressure responsive brake-operating member in said cylinder, of control valve mechanism for the pressure-responsive brake-operating member comprising a casing provided with a release port, a suction inlet port and a brake cylinder port connected with said brake cylinder, and superimposed inlet and release leaf spring valves mounted in said casing, means normally urging said valves to a release position, valve-operating means under the control of the operator comprising a pair of movable plungers respectively associated with said valves, one plunger connected to first move said release valve to its seat and then move the other of said plungers to open the inlet valve, said plungers being also movable relative to each other to establish a lap position and each plunger having relatively movable, yieldably connected parts.

8. In brake operating apparatus for automotive vehicles, the combination with a brake cylinder and a pressure responsive brake-operating member, of control valve mechanism for the pressure-responsive brake-operating member comprising a casing provided with a release port, a suction inlet port and a brake cylinder port connected with said brake cylinder and superimposed inlet and release spring valves mounted in said casing, valve-operating means including a pair of movable plungers respectively associated with said valves, one plunger connected to first move said release valve to its seat and then move the other of said plungers to open the inlet valve controlling the suction inlet port, said plungers being also movable relative to each other to establish a lap position of said valves, an actuator for said plungers, manually operable means for moving said actuator, and means connecting said actuator with said pressure responsive member for also moving said actuator to control the operation of said valve.

In testimony whereof, I affix my signature.

NIELS A. CHRISTENSEN.